US006931259B2

United States Patent
Simmons et al.

(10) Patent No.: US 6,931,259 B2
(45) Date of Patent: Aug. 16, 2005

(54) INTEGRATED CIRCUIT ARCHITECTURE FOR PROGRAMMABLE WIRELESS DEVICE

(75) Inventors: Laura E Simmons, Corvallis, OR (US); James Daren Bledsoe, Albany, OR (US); Daniel I Croft, Corvallis, OR (US); Patrick A. McKinley, Corvallis, OR (US); Gregory Frank Carlson, Corvallis, OR (US); Ignacio Jose Perez, Salem, OR (US); Paul Anthony Chenard, Corvallis, OR (US); Raymond Jensen Hasler, Doynton (GB); Shelly Rose Reasoner, Corvallis, OR (US); Todd Alan McClelland, Corvallis, OR (US); Thomas P. Bruch, Corvallis, OR (US)

(73) Assignee: Agilnet Technologies, Inc., Palo Alto, CA (US)

( * ) Notice: Subject to any disclaimer, the term of this patent is extended or adjusted under 35 U.S.C. 154(b) by 359 days.

(21) Appl. No.: 09/969,941

(22) Filed: Oct. 2, 2001

(65) Prior Publication Data

US 2003/0064747 A1 Apr. 3, 2003

(51) Int. Cl.[7] ............................................... H04M 1/00
(52) U.S. Cl. ............................... 455/550.1; 455/556.1; 455/556.2
(58) Field of Search ................................ 455/100, 101, 455/102, 550, 552.1, 556.1, 556.2, 557

(56) References Cited

U.S. PATENT DOCUMENTS

| | | | |
|---|---|---|---|
| 5,634,080 A | * | 5/1997 | Kikinis et al. ................. 710/73 |
| 5,797,089 A | | 8/1998 | Nguyen |
| 5,943,421 A | | 8/1999 | Grabon |
| 6,334,046 B1 | | 12/2001 | Philipson et al. |
| 6,424,369 B1 | * | 7/2002 | Adair et al. .................. 348/76 |
| 6,455,915 B1 | * | 9/2002 | Wong ......................... 257/531 |

* cited by examiner

Primary Examiner—Duc Nguyen
(74) Attorney, Agent, or Firm—Pamela Lau Kee

(57) ABSTRACT

The present invention is an integrated system on a chip that combines wireless, graphics, and multimedia. The graphics and multimedia features may be programmed by the end user while restricting programmability of the wireless features.

16 Claims, 5 Drawing Sheets

INTEGRATED CIRCUIT ARCHITECTURE FOR PROGRAMMABLE WIRELESS DEVICE

BACKGROUND

Demand for cellular phones is soaring, forcing makers of wireless equipment and network operators to invest billions to meet humanity's inexhaustible thirst for getting connected anywhere, anytime. Consumers expect their phones to deliver very clear voice signals and to pick up their e-mail, albeit slowly. But as frustrated callers know, communicating with mobile phones is tricky. Today's wireless networks use a maze of incompatible transmission standards, so users aren't guaranteed a dial tone when they travel. U.S. wireless operators alone use three competing standards, and just one of these is compatible with the leading standard in Europe, which itself has several variants. Most Asian wireless networks are built to another standard.

The wireless revolution's troubles go beyond conflicting standards. Consumers consistently expect more advanced features, e.g. Internet access. Worldwide, companies are spending billions to build a new network, usually referred to as "third generation," or 3G, that is expected to bring broadband—detailed Web pages, music, even video—to your mobile phone. While exciting for consumers, these advances carry a price, since there's currently no easy way to upgrade mobile phones, or the base stations that carry their signals to the network, without changing hardware. Moreover, the wireless industry can't predict which offerings will be winners; the consequences of failing to guess right can be devastating.

The first cell phones relied on dozens of hardware components. In the past 15 years, programmable chips have been added, but their function is set immutably at manufacture. Today, dedicated, single-purpose chips do most of the work in mobile phone handsets and base stations; these chips are made as simple as possible to keep costs down. Given the conflicting standards and the uneven advent of the next generation of broadband wireless, manufacturers are starting to see dedicated components as a liability. A manufacturer that guesses wrong about the future standard will find itself with a lot of useless junk in its warehouses.

So more-general-purpose software that can be reprogrammed looks appealing. If mobile phones and their base stations were computers, new software could download easily through their wires. But wireless communication is fundamentally different. Mobile phones must push signals across the airwaves at precisely the right power level and in the exact transmission format. They must be tuned to receive incoming, powerful signals from one or more channels. Antennas catch irregular analog signals traveling through space on "carrier" frequencies; incoming radio signals must then be converted to an intermediate frequency through combination with another radio wave produced inside the receiver. Then the carrier wave gets subtracted to put the signal in baseband—that is, a power level and speed that ordinary digital processors can handle. While the signal is in baseband, it is translated into a stream of binary ones and zeroes, which are in turn decoded, decrypted and formatted into voice or data.

The first operations to benefit from reprogrammable software are operations in the baseband. In one model of Motorola base station, for example, the software that performs the baseband coding and decoding is reprogrammable.

Next, manufacturers would like reprogrammable software to handle the intermediate-frequency and radio-frequency parts of the job. That's a more difficult technological challenge, in part because silicon—which is by far the most common and least expensive chip material—does not handle radio-wave signals well. Radio-frequency processing of broadband signals will most likely use gallium arsenide chips running 100 billion instructions per second, compared to the roughly 10 to 100 million instructions per second in single-purpose chips in present-day phones.

The rise in computing complexity is exacerbated by the push to send signals much faster. So-called third-generation broadband wireless service could move data at two megabits per second, a roughly hundredfold leap from the operating speeds of most of today's wireless networks. All these demands mean chips will require lots more power; added power is far more easily obtained in a base station than in a small, lightweight mobile phone.

To start with, however, manufacturers are putting reprogrammable chips mainly into base stations that relay signals from cell phones to the network. Unlike handsets, base stations have few space or power constraints. For instance, Lucent Technologies, second to Motorola as a supplier of wireless base stations worldwide, has new models that are "smart" (that is, they have a flexibility endowed by software) at the antenna.

Cramming this kind of software-derived flexibility into lightweight handsets will not be easy. Even Mitola admits that "truly breakthrough technology" will be needed for a lightweight handset to flex among three or four frequency bands and operational modes. Meanwhile, smart, software-programmable wireless sets will find their way into vehicles, which can accommodate larger and heavier systems than people's pockets can. Indeed, one early use of flexible software radio technology will be in radios in police and fire vehicles: public safety agencies' wireless systems are notoriously incompatible. The FCC is encouraging public agencies to adopt this technology. Several firms, such as Vanu of Cambridge, Mass., are developing equipment for this market.

Wireless devices that morph through different "personalities" on the fly would be a boon to their users. But at the same time they create policy problems, as new technologies that cross boundaries often do. Historically, the FCC authorizes each piece of equipment for a type of use and specific channel. How should the regulators license mobile phones and base stations that can readily be changed after they're in use? How free should third parties be to load new software into your phone? How will it be possible to distinguish legitimate upgrades of the network from rogues trying subvert it?

SUMMARY

The present invention is an integrated system on a chip that combines wireless, graphics, and multimedia. The graphics and multimedia features may be programmed by the end user while restricting programmability of the wireless features. The system includes a wireless section bidirectionally communicating with a high speed wireless bus. A personal data assistant (PDA) section bidirectionally communicating with a high speed PDA bus. A mail box electrically connected to the high speed wireless buss and the high speed PDA bus. The entire system is preferably integrated on a unitary substrate.

The wireless section includes a baseband processor connected to the high speed wireless bus. A general wireless microprocessor connects to the high speed wireless bus. A wireless memory controller and a low speed wireless bus bidirectionally communicates to the high speed wireless bus. A wireless peripheral bidirectionally communicates to the low speed wireless bus.

The PDA section includes a multimedia microprocessor and a PDA microprocessor connected to the high speed PDA bus. A PDA memory controller and a low speed PDA bus bidirectionally communicates to the high speed PDA bus. At least one PDA peripheral bidirectionally communicates to the low speed PDA bus. An optional high multi-media bus may be connected to the PDA memory controller. In an alternate embodiment, a high speed graphics bus connects to the PDA peripheral and the PDA memory controller.

DETAILED DESCRIPTION

A main problem associated with prior art integrated user programmable and cellular platform is the opportunity for a user application to bring down the cellular network if it corrupts the memory region. To aid in preventing this behavior, the present invention has two major subsystems: a user-programmable sub-system, containing the multi-media and personal digital assistant (PDA) functions, and a protected wireless subsystem. Access to the wireless subsystem from the user-programmable sub-system is not supported. From the user's point of view, the wireless subsystem is a black box that cannot be programmed. Control information is passed to from the user-programmable subsystem to the wireless subsystem via a mailbox. The control data in the mailbox must correspond to a predefined set of operations or it will be rejected by the wireless subsystem. Thus, the end user can influence the wireless subsystem without having direct access to it.

Figure 1:
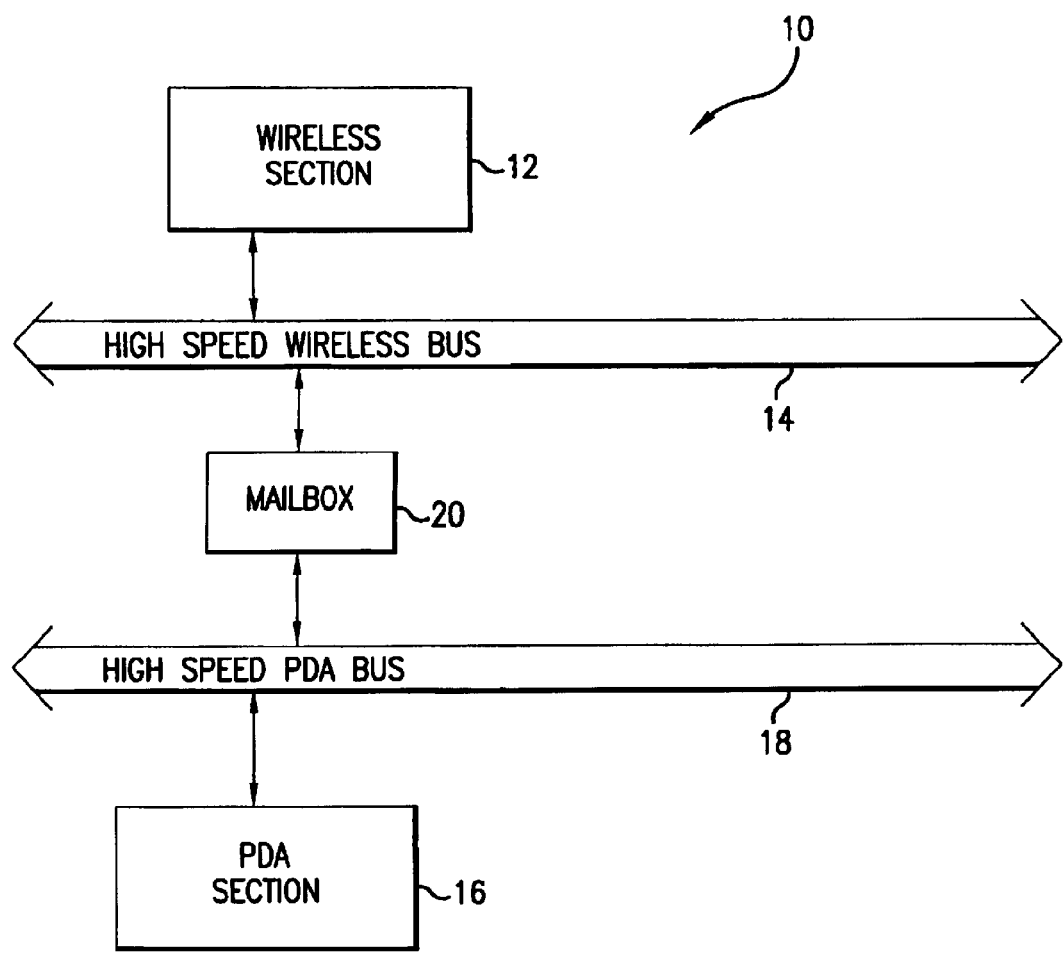
FIG. 1 is top level functional block diagram of the present invention.

FIG. 1 is top level functional block diagram of the present invention. A system 10 includes a wireless section 12 in bi-directional communication with a high speed wireless bus 14. A personal digital assistant (PDA) section 16 bidirectionally communicates with a high speed PDA bus 18. A mail box 20 electrically connects the high speed wireless bus 14 and the high speed PDA bus 18. The entire system 10 is preferably integrated onto a unitary substrate (not shown). Throughout the entire system, it is preferable that the busses be 32 bits wide.

Communication between subsystems is accomplished via an interrupt driven mailbox system. When the user-programmable subsystem wishes to assign a task to the protected wireless subsystem, it places the task into the mailbox, along with any required information and pointers, and signals an interrupt to the general wireless processor that it has a message waiting. The processor then reads its mailbox and performs the task.

At the heart of the system is a high-speed multi-layer bus system that allows the appropriate interconnects and necessary bandwidth between subsystems to support the various functions of the chip. Each subsystem is connected to its own layer but each layer is not directly connected to each other. Instead, communication between layers is facilitated by peripherals that interface onto multiple subsystem layers. To illustrate, the memory controllers are connected to the PDA and optional multi-media layers. This allows a high degree of concurrency and bandwidth availability since multiple transactions can be occurring simultaneously. As will be described later, a multi-media processor can be transferring data from synchronous memory to an advanced audio Codec while the PDA processor is fetching code from static memory. Neither transfer affects the bandwidth of the other. Additionally, the multi-layer bus allows the interconnects to be rerouted as needed by the system. As a result, the static memory controller can be attached to the PDA processor's bus in one scenario and the multi-media processor's bus in another, depending upon the particular path that data needs to flow on.

Figure 2:
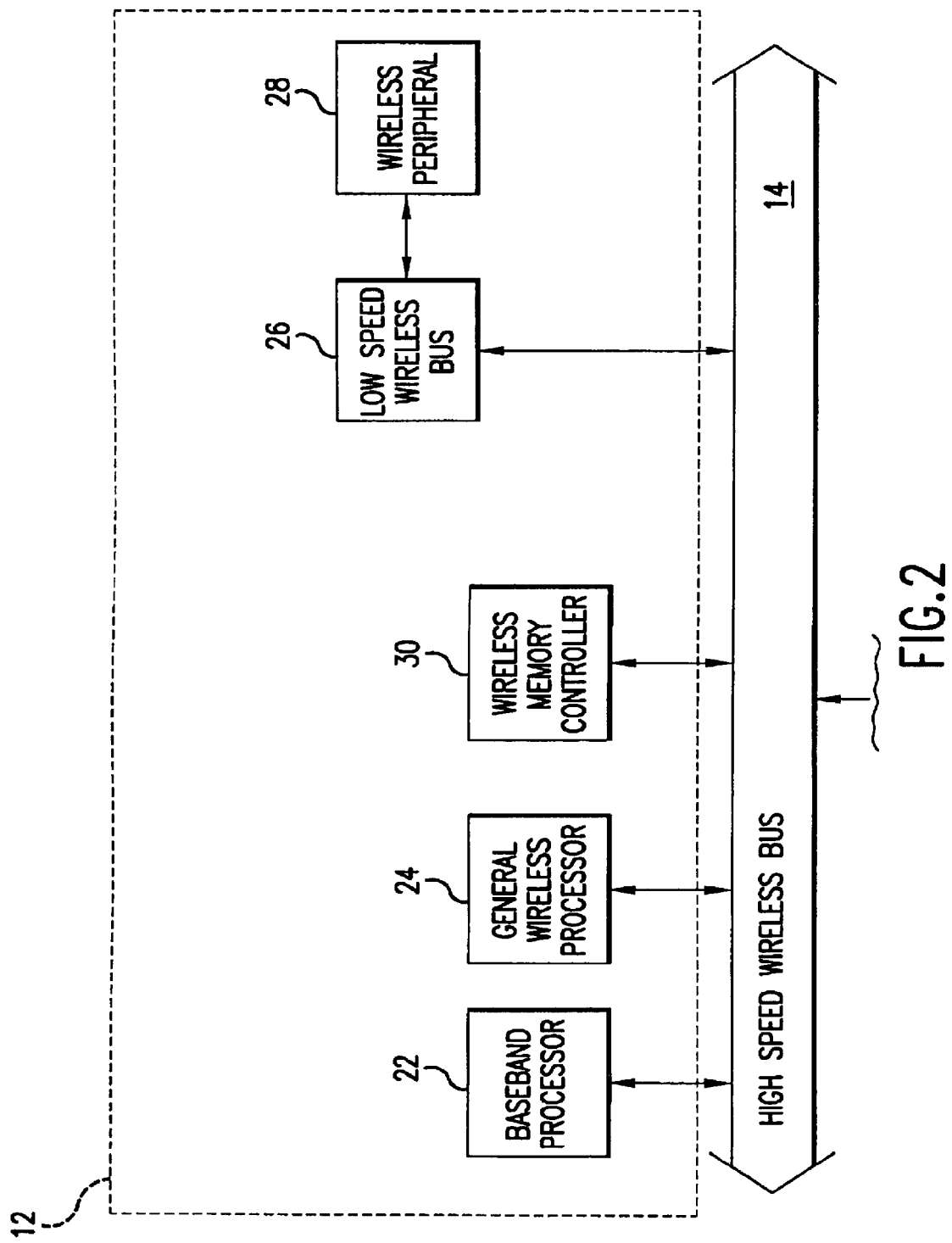
FIG. 2 illustrates a functional block diagram of the wireless section shown in FIG. 1.

FIG. 2 illustrates a functional block diagram of the wireless section 12 shown in FIG. 1. The high speed wireless bus 14 connects to a baseband processor 22 and a general purpose wireless microprocessor 24. A low speed wireless bus 26 bidirectionally connects to the high speed wireless bus 14. At least one wireless peripheral 28 bidirectionally connects to the low speed wireless bus 26. A wireless memory controller 30 bidirectionally communicates with the high speed wireless bus.

The baseband processor 22 is preferably a digital signal processor (DSP). A DSP allows for more efficient code. The general purpose wireless microprocessor is preferably a CISC or RISC-based microprocessor. The wireless peripheral 28 communication may include a 3G (UMTS), CDMA-2000, GSM, GPRS, GPS, Bluetooth, 802.11, IS-95, or IS-136.

The general purpose wireless microprocessor 24 is responsible for executing the layer 2 and above software for all of the wireless functions, and booting and providing task dispatching to the baseband microprocessor. The baseband processor 22 is responsible for running all of the algorithms necessary to provide a layer 1 cellular solution. Neither processor is programmable by the end-user for security purposes.

Figure 3:
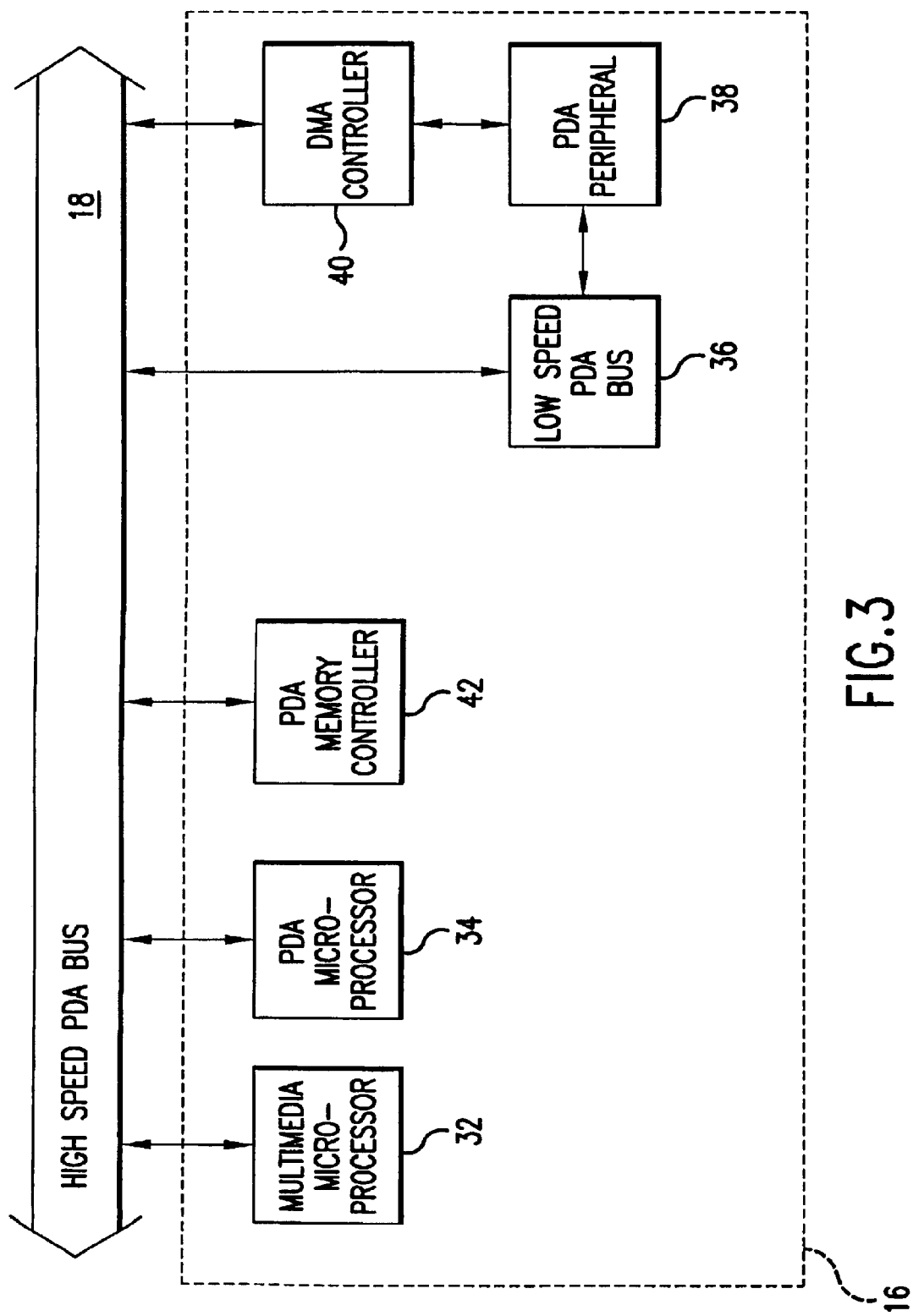
FIG. 3 illustrates a functional block diagram of the PDA section shown in FIG. 1.

FIG. 3 illustrates a functional block diagram of the PDA section 16 shown in FIG. 1. The high speed PDA bus 18 is connected to a multimedia microprocessor 32 and a PDA microprocessor 34. A low speed PDA bus 36 bidirectionally connects to the high speed PDA bus 18. At least one PDA peripheral 38 bidirectionally connects to the low speed PDA bus 36 and the DMA controller 40. A PDA memory controller 42 bidirectionally communicates with the high speed PDA bus 18.

The multimedia microprocessor 32 is preferably a digital signal processor (DSP).

A DSP allows for more efficient code. The PDA microprocessor 34 is preferably a CISC or RISC-based microprocessor. The PDA peripheral 36 may be any I/O device that can be used on a portable computing device or connected to a serial port, e.g. a Universal Serial Bus, secure data I/O, infra-red, Audio Codec, Touchscreen controller, Digital Camera Interface, a LCD controller, pulse width modulators, or a memory stick.

The PDA processor 34 is responsible for running the main operating system and associated user applications, controlling the PDA peripheral blocks, and for providing task dispatching to the multi-media processor and the wireless system.

It is also responsible for handling the boot-up sequence of the multi-media processor.

Figure 4:
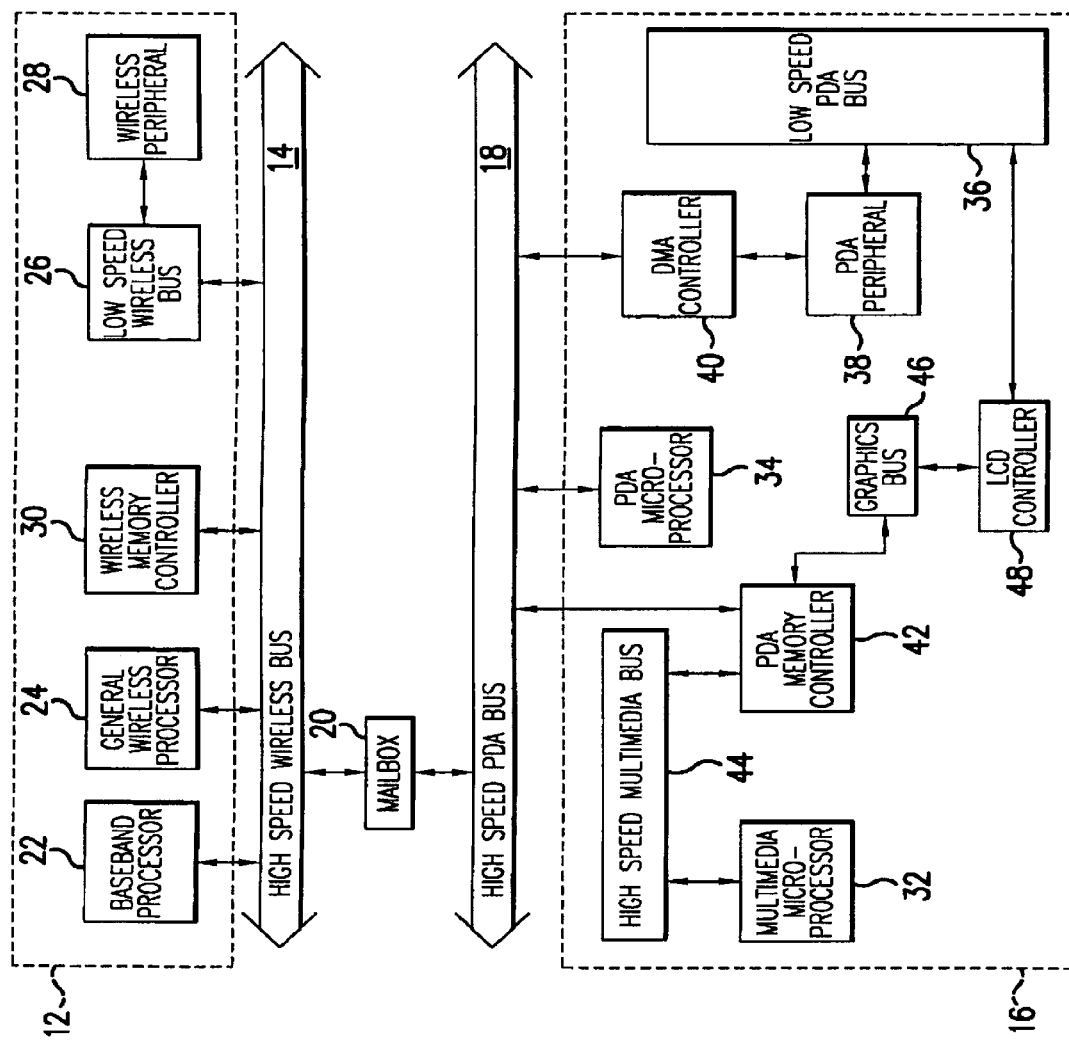
FIG. 4 illustrates at alternate embodiment of the present invention.

While the previous embodiment illustrates a two bus system, as shown in FIG. 4, a multimedia and graphics bus may be added to increase bandwidth available to IC designer using a chip. In addition to the high speed PDA bus 18, the system includes a high speed multi-media bus 44 and a high speed graphics bus 46. The high speed PDA bus 18 bidirectionally communicates with the DMA controller 40, PDA memory controller 42, PDA processor 34, and low speed PDA bus 36. The high speed multi-media bus 44 bidirectionally communicates with the PDA memory controller 42 and multimedia microprocessor 32 within the PDA section. The high speed graphics bus 46 communicates with the LCD controller 48 and the PDA memory controller 42. Throughout the entire system, it is preferable that the busses be 32 bits wide.

In this embodiment, the multi-media processor 32 is responsible for running user programmed multi-media related algorithms such as MPEG-3 decoding and performing the voice en/decoding functions required for the cellular portion of the wireless subsystem. This allows some of the functionality to be off-loaded from the other processors in the architecture and increases the amount of the parallel processing power available in the system.

Figure 5:
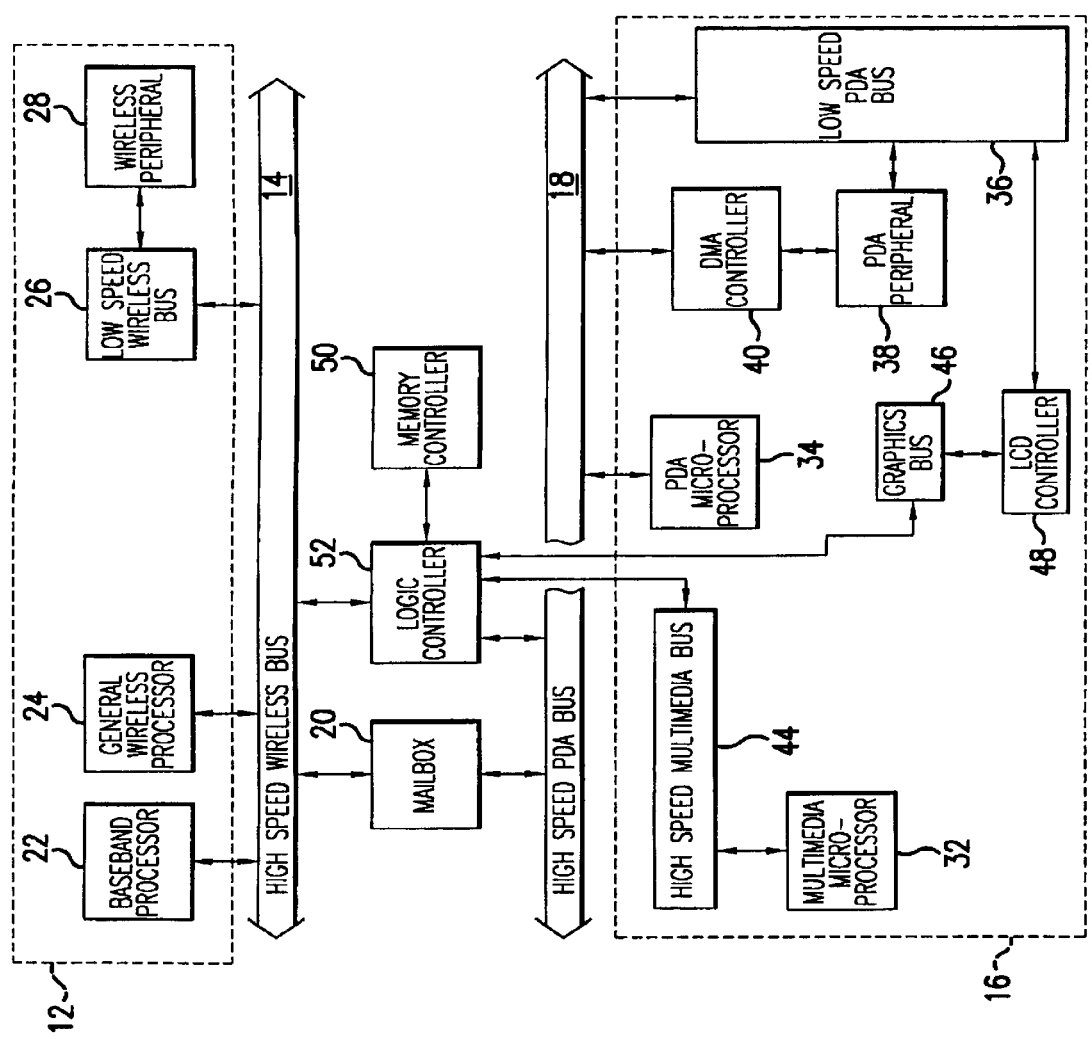
FIG. 5 illustrates an alternate embodiment of the general system shown in FIG. 1.

FIG. 5 illustrates an alternate embodiment 10' of the general system shown in FIG. 1. In FIG. 1, the memory controllers 30, 42 for the wireless and PDA sections are separate modules on the same substrate. In FIG. 5, there is a logic controller 52 and a memory controller 50 between the wireless and PDA sections 12, 16. The logic controller 52 logically separates the two memory control sections to prevent inadvertent access of the wireless portion of the memory controller.

We claim:

1. A system comprising:
    a wireless section having wireless inputs and wireless outputs;
    a high speed wireless bus, receiving the wireless outputs from the wireless section, relaying the wireless inputs to the wireless section;
    a user-programmable personal data assistant (PDA) section having multimedia inputs and multimedia outputs;
    a high speed PDA bus, receiving the multimedia outputs from the PDA section, relaying the multimedia inputs to the PDA section; and
    a mail box, electrically connected to the high speed wireless buss and the high speed PDA bus for passing control data from the PDA section to the wireless section, wherein the control data must correspond to a predefined set of operations to be accepted by the wireless section.

2. A system, as defined in claim 1, further comprising a unitary substrate, wherein the wireless section, high speed wireless bus, PDA section, high speed PDA bus, and mail box are integrated on to the unitary substrate.

3. A system, as defined in claim 2, the wireless section comprising:
    a wireless microprocessor connected to the high speed wireless bus;
    a general wireless microprocessor connected to the high speed wireless bus;
    a memory controller bidirectionally connected to the high speed wireless bus;
    a low speed wireless bus bidirectionally connected to the high speed wireless bus; and
    a wireless peripheral bidirectionally connected to the low speed wireless bus.

4. A system, as defined in claim 3, wherein the wireless microprocessor is a digital signal processor.

5. A system, as defined in claim 3, wherein the general wireless microprocessor is selected from a group that includes CISC and RISC-based microprocessors.

6. A system, as defined in claim 2, the PDA section comprising:
    a multimedia microprocessor connected to the high speed PDA bus;
    a PDA microprocessor connected to the high speed PDA bus;
    a PDA memory controller bidirectionally connected to the high speed PDA bus;
    a low speed PDA bus bidirectionally connected to the high speed PDA bus; and
    a PDA peripheral, bidirectionally connected to the low speed PDA bus.

7. A system, as defined in claim 6, wherein the multimedia microprocessor is a digital signal processor.

8. A system, as defined in claim 6, wherein the PDA microprocessor is selected from a group that includes CISC and RISC-based microprocessors.

9. A system, as defined in claim 2, the PDA section comprising:
    a multimedia microprocessor;
    a PDA memory controller, bidirectionally connected to the high speed PDA bus;
    a high speed multimedia bus, bidirectionally connected to the multimedia microprocessor and the PDA memory controller;
    a PDA microprocessor, connected to the high speed bus;
    a low speed PDA bus, bidirectionally connected to the high speed PDA bus;
    a direct memory access controller, bidirectionally connected to the high speed PDA bus;
    a PDA peripheral bidirectionally connected to the direct memory access controller and the low speed PDA bus;
    a graphics bus, bidirectionally connected to the PDA memory controller; and
    an LCD controller bidirectionally connected to the graphics bus and the low speed PDA bus.

10. A system, as defined in claim 9, wherein the multimedia microprocessor is a digital signal processor.

11. A system, as defined in claim 9, wherein the PDA microprocessor is selected from a group that includes CISC and RISC-based microprocessors.

12. A system, as defined in claim 2, further comprising:
    a memory controller; and
    a logic controller, bidirectionally connected to the memory controller, PDA section, high speed wireless bus, and the high speed PDA bus.

13. A system, as defined in claim 12, the PDA section including,
    a multimedia microprocessor;
    a high speed multimedia bus, bidirectionally connected to the multimedia microprocessor and the logic controller;
    a PDA microprocessor, connected to the high speed bus;
    a low speed PDA bus, bidirectionally connected to the high speed PDA bus;
    a direct memory access controller, bidirectionally connected to the high speed PDA bus;
    a PDA peripheral bidirectionally connected to the direct memory access controller and the low speed PDA bus;

a graphics bus, bidirectionally connected to the logic controller; and an LCD controller bidirectionally connected to the graphics bus and the low speed PDA bus.

14. A system, as defined in claim 13, wherein the multimedia microprocessor is a digital signal processor.

15. A system, as defined in claim 13, wherein the PDA microprocessor is selected from a group that includes CISC and RISC-based microprocessors.

16. A system, as defined in claim 13, the wireless section comprising:

a wireless microprocessor connected to the high speed wireless bus;

a general wireless microprocessor connected to the high speed wireless bus;

a low speed wireless bus bidirectionally connected to the high speed wireless bus; and a wireless peripheral bidirectionally connected to the low speed wireless bus.

* * * * *